(12) United States Patent
Ochiai

(10) Patent No.: US 7,552,939 B2
(45) Date of Patent: Jun. 30, 2009

(54) AIRBAG APPARATUS HAVING SUPPORT MEMBER ATTACHED TO VEHICLE VIA EASILY-DEFORMABLE BRACKETS AT BOTH ENDS

(75) Inventor: Fumiharu Ochiai, Nasushiohara (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 11/668,837

(22) Filed: Jan. 30, 2007

(65) Prior Publication Data

US 2007/0296187 A1 Dec. 27, 2007

(30) Foreign Application Priority Data

Feb. 2, 2006 (JP) ............... 2006-025811

(51) Int. Cl.
 *B60R 21/21* (2006.01)
(52) U.S. Cl. ................................. 280/728.2; 280/730.2
(58) Field of Classification Search ............. 280/728.2, 280/730.2; 296/187.12
 See application file for complete search history.

(56) References Cited

U.S. PATENT DOCUMENTS

| 4,958,884 | A | * | 9/1990 | Gold ..................... 296/187.12 |
| 5,056,861 | A | * | 10/1991 | Garnweidner et al. .. 296/187.12 |
| 5,072,966 | A | * | 12/1991 | Nishitake et al. ......... 280/730.2 |
| 5,314,228 | A | * | 5/1994 | Figge, Sr. ................. 296/146.6 |
| 5,588,692 | A | * | 12/1996 | Gandhi et al. ............. 296/146.7 |
| 5,800,007 | A | * | 9/1998 | Cho ........................ 296/146.6 |
| 5,820,157 | A |  | 10/1998 | Matsumoto |
| 6,033,011 | A | * | 3/2000 | Kim ....................... 296/187.12 |
| 6,086,091 | A | * | 7/2000 | Heinz et al. .............. 280/728.3 |
| 6,312,045 | B2 | * | 11/2001 | Kitagawa ............... 296/187.12 |
| 6,378,896 | B1 | * | 4/2002 | Sakakida et al. ......... 280/730.2 |
| 2002/0069609 | A1 | * | 6/2002 | Nees et al. .................. 52/735.1 |
| 2005/0052005 | A1 | * | 3/2005 | Lunt et al. ............... 280/730.2 |
| 2007/0108746 | A1 | * | 5/2007 | Ochiai et al. ............. 280/730.2 |

FOREIGN PATENT DOCUMENTS

| JP | 0224970 | A | * | 10/1990 |
| JP | 04356245 | A | * | 12/1992 |
| JP | 8-258651 | | | 10/1996 |
| JP | 9-24790 | | | 1/1997 |
| JP | 10-119698 | | | 5/1998 |

* cited by examiner

*Primary Examiner*—Faye M. Fleming
*Assistant Examiner*—Laura Freedman
(74) *Attorney, Agent, or Firm*—Rankin, Hill & Clark LLP

(57) ABSTRACT

An airbag apparatus includes: a main body having an air bag; and a support member to which the main body is attached so as to arrange the airbag apparatus in a door or a side wall of a vehicle. The support member is attached to the vehicle body via a pair of bracket members which are positioned in the vicinity of both ends of the support member and are easily deformable when an impact is applied. The support member has a fastening part between the bracket members, and is fastened to the vehicle body via the fastening part. Before the airbag apparatus is attached to the vehicle body, the main body and the support member may be coupled with each other using at least one of a common fastening of them to the bracket members and a mutual coupling between them at the position of the fastening part.

2 Claims, 4 Drawing Sheets

AIRBAG APPARATUS HAVING SUPPORT MEMBER ATTACHED TO VEHICLE VIA EASILY-DEFORMABLE BRACKETS AT BOTH ENDS

BACKGROUND OF THE INVENTION

1. Field of the Invention

The present invention relates to an airbag apparatus provided at a door or a side wall of a vehicle.

Priority is claimed on Japanese Patent Application No. 2006-025811, filed Feb. 2, 2006, the content of which is incorporated herein by reference.

2. Description of the Related Art

In a known example of an airbag apparatus provided on a door of a vehicle, an airbag module having an inflator and an airbag is fastened using a pair of bracket members to an inner panel of the door, so that the position of the airbag module is not changed even when an impact is locally applied to the module (see, for example, Japanese Unexamined Patent Application, First Publication No. H10-119698).

In the above structure, the airbag module is attached to the door using only the bracket members, which may cause noise when the vehicle runs, and it is difficult to provide a desired rigidity for receiving the reaction force generated when the airbag is deployed.

SUMMARY OF THE INVENTION

In light of the above circumstances, an object of the present invention is to provide an airbag apparatus for preventing vibration and noises produced when the vehicle runs, and for simultaneously providing a rigidity for receiving reaction force generated when the airbag is deployed.

Therefore, the present invention provides an airbag apparatus (e.g., an airbag apparatus 10 in an embodiment explained later) for a vehicle, comprising:

a device main body (e.g., a device main body 23 in the embodiment) having an inflator (e.g., an inflator 20 in the embodiment) and an air bag (e.g., an airbag 22 in the embodiment) which is expanded toward a passenger of the vehicle by a gas jet from the inflator; and a support member (e.g., a support member 30 in the embodiment) to which the device main body is attached so as to arrange the airbag apparatus in a door or a side wall of the vehicle, wherein:

the support member is attached to a body of the vehicle via a pair of bracket members (e.g., bracket members 31 and 32 in the embodiment) which are positioned in the vicinity of both ends of the support member and are easily deformable when an impact is applied; and the support member has a fastening part (e.g., a fastening part 34 in the embodiment) positioned between the bracket members, and is fastened to the body of the vehicle via the fastening part.

In accordance with the above structure, the support member, to which the device main body (having the inflator and the airbag) is attached, is (i) attached to the vehicle body using the pair of the bracket members which are provided in the vicinity of both ends of the support member and can be easily deformed, and (ii) fastened to the vehicle body via the fastening part positioned between the bracket members. Therefore, in comparison with the case of attaching the support member to the vehicle body using only the bracket members, it is possible to suppress vibration and noise generated when the vehicle runs or the like, and also to provide rigidity necessary for receiving the reaction force generated when the airbag is deployed.

In addition, the bracket members can be easily deformed with respect to the fastening part as a support point. Therefore, even when a local impact is applied, the bracket members are deformed so as to prevent the device main body from being deformed (e.g., bent), thereby protecting the device main body.

Furthermore, the support member is fastened via the fastening part to the vehicle body. Therefore, (i) even if the bracket members are broken at the worst, it is possible to reliably prevent the device main body from being detached from the vehicle body, and (ii) it is possible to prevent inaccurate positioning of the device main body attached to the support member with respect to the vehicle body.

In a preferable example, the device main body and the support member are coupled with each other in advance, using at least one of a common fastening of them to the bracket members and a mutual coupling between them at the position of the fastening part between the bracket members.

Additionally, the device main body and the support member are coupled with each other by (i) common fastening to the bracket members, and (ii) common fastening to the position between the bracket members. Therefore, such common fastening can be performed in advance so as to form a module and easily and reliably attach the module to the vehicle body.

DETAILED DESCRIPTION OF THE INVENTION

Hereinafter, an embodiment of the airbag apparatus in accordance with the present invention will be described with reference to the appended figures.

Figure 1:
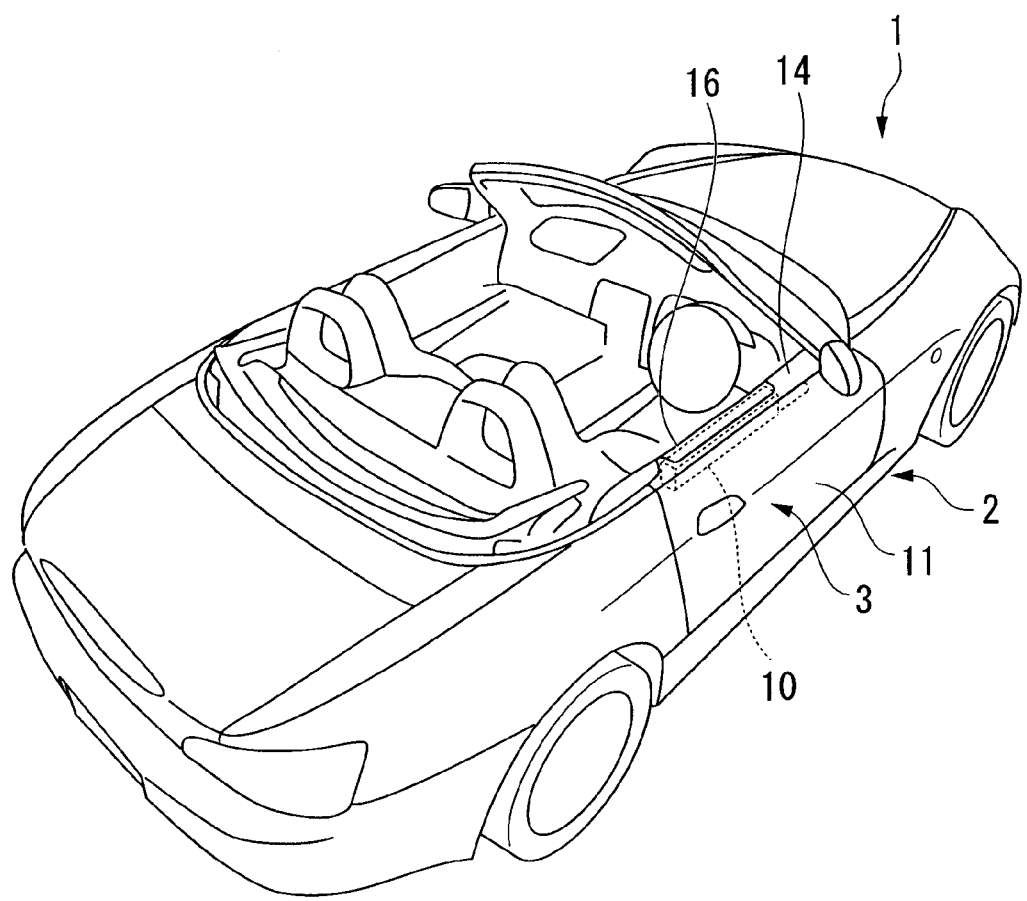
FIG. 1 is a perspective view of a vehicle, to which the airbag apparatus as an embodiment in accordance with the present invention is applied, observed from the back side.

FIG. 1 shows a four-wheel vehicle 1 having an open-roof form in which a roof can be opened and closed, or be detachably attached. A door 3 is provided on a side of a vehicle body 2, and an airbag apparatus 10 is provided on the door 3.

Figure 2:
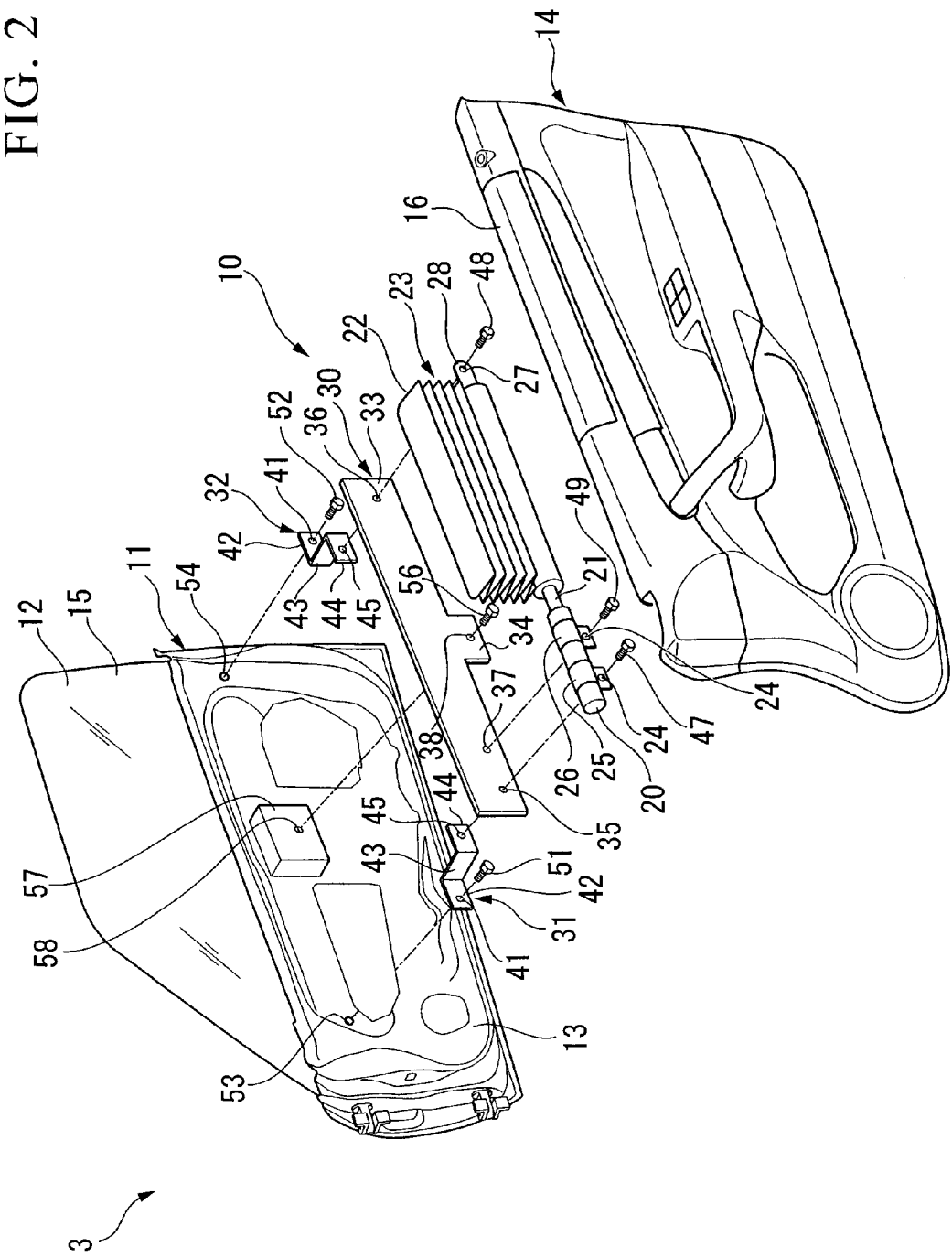
FIG. 2 is an exploded perspective view of a door to which the airbag apparatus of the embodiment is applied.
Figure 3:
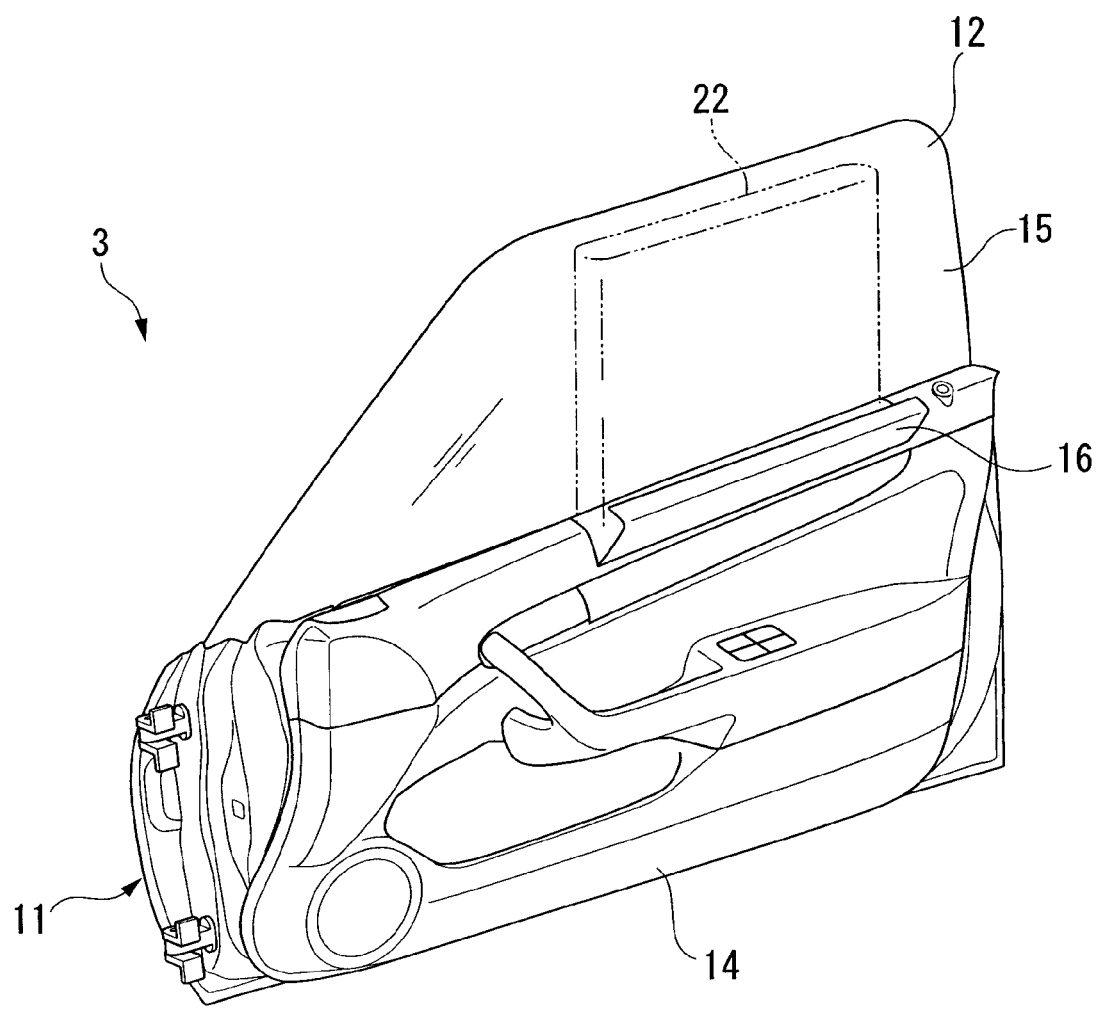
FIG. 3 is a perspective view of the door to which the airbag apparatus of the embodiment is applied.

FIG. 2 is an exploded perspective view of a side portion of the vehicle, specifically, the door 3 on the right side of the vehicle. FIG. 3 is a perspective view showing the assembled door 3. In the following explanation, the door 3 is in the closed state.

The door 3 has: a door main body 11 made of metal, which is arranged substantially perpendicularly to a width direction of the vehicle; a windowpane 12 which extends upward from the door main body 11 along the door main body 11, and can be raised or lowered; and a door lining 14 which covers the inner side (toward the interior of the vehicle) of an inner panel 13 which is an inner-side member (i.e., toward the interior of the vehicle) of the door main body 11. The door lining 14 functions as a design surface toward the interior of the vehicle.

A window 15 is formed above the door main body 11, and is closed and opened by raising or lowering the windowpane 12 which functions as a part of the window 15. The door main body 11 made of metal is a high-rigidity portion of the door 3, and functions as a part of the vehicle body 2 when the door 3 is closed.

An opening and closing part 16 is provided in a specific area of the upper edge in the door lining 14. The opening and closing part 16 has a rectangular shape which is long along the front-to-back direction of the vehicle, and can be opened when rotating around the lower edge thereof. The airbag apparatus 11 of the present embodiment is arranged between this opening and closing part 16 and the door main body 11.

The airbag apparatus 10 has a device main body 23 which includes: an inflator 20 which is covered by metal, has a substantially cylindrical shape, and generates a gas when it is electrically ignited; a pipe member 21 coupled to an end of the inflator 20 substantially coaxially to the inflator 20 so as to guide the gas jet from the inflator 20; and an airbag 22 which is coupled to the other end (i.e., on the side opposite to the inflator 20) of the pipe member 21 and is expanded by the gas jet from the inflator 20.

Two metal attachment bands 25 and 26, each having an attachment hole 24, are attached to the inflator 20. The airbag 22 has an attachment part 28 on the side opposite to the inflator 20, which also has an attachment hole 27.

The airbag apparatus 10 also has: a support member 30 having a plate shape, to which the device main body 23 is attached; and a pair of bracket members 31 and 32, each having a specifically bent-plate shape, for attaching the support member 30 to the vehicle body, specifically, the inner panel 13 of the door main body 11.

The support member 30 has: a main plate part 33 having a rectangular shape, whose length is substantially the same as that of the device main body 23; and a fastening part 34 extending downward in the same plane of the main plate part 33, from a specific center position of the main plate part 33 along the length thereof. The support member 30 is made of a metal plate having a relatively high rigidity. The main plate part 33 has attachment holes 35 and 36 at both ends along the length thereof. A screw hole 37 is also provided on the inner side with respect to one attachment hole 35 along the length of the main plate part 33. An attachment hole 38 is also formed in the fastening part 34.

The pair of the bracket members 31 and 32 each have: a fastening plate part 42 having a plate shape, in which an attachment hole 41 is formed; a coupling plate part 43 having a plate shape, which extends perpendicularly from an edge of the fastening plate part 42; and a support plate part 44 having a plate shape, which extends from an edge (opposite to the edge toward the fastening plate part 42) of the coupling plate part 43 in a direction opposite to the extending direction of the fastening plate part 42 in a manner such that the fastening plate part 42 and the support plate part 44 are parallel to each other. A screw hole 45 is formed in the support plate part 44. The bracket members 31 and 32 are made of metal, which can be more easily deformed in comparison with the support member 30 when an impact larger than a certain level is applied.

A bolt 47, which is inserted through the attachment hole 24 of the outer attachment band 25 in the device main body 23 in which the airbag 22 is folded and also through the attachment hole 35 (one of the attachment holes) of the support member 30, is screwed into the screw hole 45 formed in the support plate part 44 of the bracket member 31 (i.e., one of the bracket members), so that the device main body 23 and the support member 30 are both fastened to the bracket member 31. In this state, this bracket member 31 is attached to a side of the support member 30, opposite to the side facing the device main body 23 in a manner such that the fastening plate part 42 extends outside of the support member 30 along the length of the support member 30.

Similarly, a bolt 48, which is inserted through the attachment hole 27 of the attachment part 28 on the opposite side of the device main body 23 and also through the other attachment hole 36 of the support member 30, is screwed into the screw hole 45 formed in the support plate part 44 of the other bracket member 32, so that the device main body 23 and the support member 30 are also both fastened to this bracket member 32. Also in this state, the bracket member 32 is attached to the side of the support member 30, opposite to the side facing the device main body 23 in a manner such that the fastening plate part 42 extends outside of the support member 30 along the length of the support member 30.

In addition, a bolt 49, which is inserted through the attachment hole 24 of the inner attachment band 26 in the device main body 23, is screwed into the screw hole 37 of the support member 30, so that the device main body 23 and the support member 30 are coupled to each other also at a position between the bracket members 31 and 32.

Accordingly, the device main body 23 having the inflator 20 and the airbag 22, the support member 30 for supporting the device main body 23, and the pair of the bracket members 31 and 32 for attachment are assembled in advance before they are attached to the vehicle body. The assembled module corresponds to the airbag apparatus 10 in the present embodiment.

This airbag apparatus 10 is attached as a module via the bracket members 31 and 32 to the inner panel 13 by inserting bolts 51 and 52 respectively, which are inserted through the attachment holes 41 of the bracket members 31 and 32 on both ends of the module, into attachment holes 53 and 54 formed in the inner panel 13 of the door main body 11, and then screwing the bolts 51 and 52 into weld nuts (not shown) fastened to the back side of the attachment holes 53 and 54.

In addition, the airbag apparatus 10 is rigidly fastened to the inner panel 13 via the fastening part 34 of the support member 30 between the bracket members 31 and 32, by inserting a bolt 56, which is inserted through the attachment hole 38 formed in the fastening part 34, into an attachment hole 58 in a stand part 57 (protruding toward the interior of the vehicle) formed in the inner panel 13, and then screwing the bolt 56 into a weld nut fastened to the back side of the attachment hole 58. The pair of the bracket members 31 and 32 can be more easily deformed in comparison with the fastening part 34 which is directly fastened to the inner panel 13 using the bolt 56.

The door lining 14 is then attached to the inner panel 13 so as to cover the airbag apparatus 10 which is fastened to the inner panel 13 as described above. Accordingly, the airbag apparatus 10 is arranged in the door 3, and in this state, the airbag 22 is positioned on the outside (toward the outside of the vehicle) of the opening and closing part 16 of the door lining 14.

In the above-described airbag apparatus 10, when a vehicle crash occurs and specific deployment conditions are satisfied (e.g., a specific acceleration or more is measured), the inflator 20 is ignited, and the folded airbag 22 is expanded and deployed by the gas generated by the inflator 20. Accordingly, the airbag 22 opens the opening and closing part 16 of the door lining 14, and expands toward a side of a passenger so as to cover the inner side (toward the interior of the vehicle) of the window pane 12 (see FIG. 3).

In accordance with the airbag apparatus 10 of the above-described present embodiment, the support member 30, to which the device main body 23 (having the inflator 20 and the airbag 22) is attached, is (i) attached to the inner panel 13 of the vehicle body using the pair of the bracket members 31 and 32 which are provided in the vicinity of both ends of the support member 30 and can be easily deformed, and (ii) rigidly fastened to the inner panel 13 via the fastening part 34 positioned between the bracket members 31 and 32. Therefore, in comparison with the case of attaching the support member 30 to the inner panel 13 using only the bracket members 31 and 32, it is possible to suppress vibration and noise generated when the vehicle runs or the like, and also to provide rigidity necessary for receiving the reaction force generated when the airbag 22 is deployed.

Figure 4:
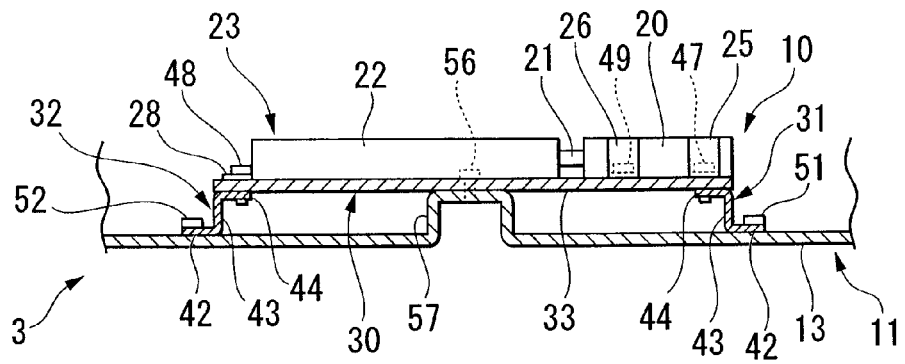
FIG. 4 is a plan sectional view showing a state before the door, to which the airbag apparatus of the embodiment is applied, is deformed.
Figure 5:
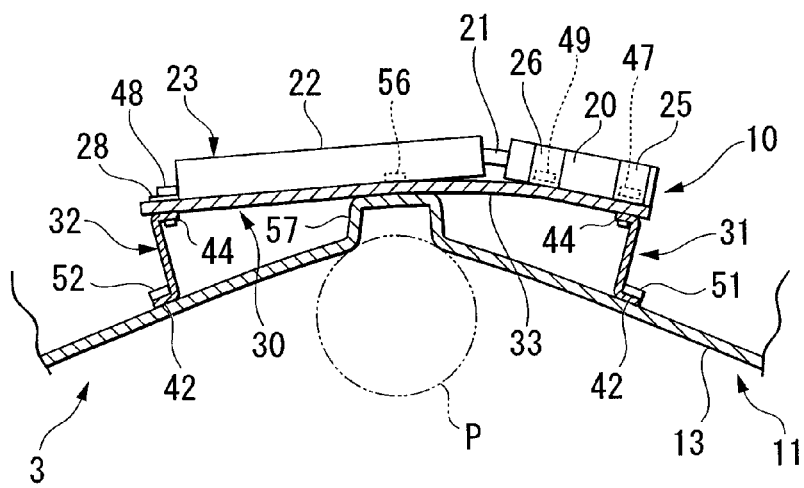
FIG. 5 is a plan sectional view showing a deformed state of the door to which the airbag apparatus of the embodiment is applied.

In addition, the bracket members 31 and 32 can be easily deformed with respect to a support point, specifically, the part where the support member 30 is fastened via the bolt 56 which passes through the fastening part 34. Therefore, even when a local impact is applied, the bracket members 31 and 32 are deformed so as to prevent the device main body 23 from being deformed (e.g., bent), thereby protecting the device main body 23. That is, even when a pre-collision state shown in FIG. 4 is changed to a post-collision state shown in FIG. 5, which occurs when a pole P as the object of collision locally deforms a part of the door main body 11 (i.e., the substantial center between the bracket members 31 and 32), the pair of the bracket members 31 and 32 extend and prevent the support member 30 and the device main body 23 supported thereby from being deformed.

Figure 6:
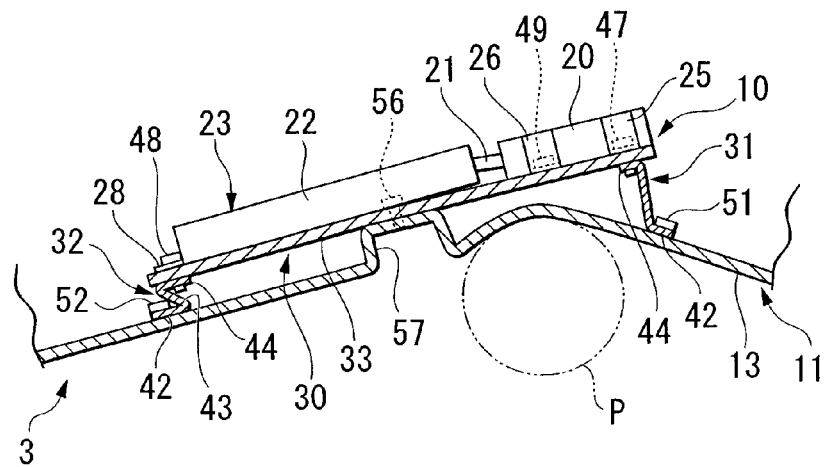
FIG. 6 is a plan sectional view showing another deformed state of the door to which the airbag apparatus of the embodiment is applied.

In another example shown in FIG. 6, even when a pole P crashes into a part in the vicinity of the inflator 20, and the part (closer to the inflator 20) between the bracket members 31 and 32 is locally deformed, the bracket member 31 closer to the inflator 20 extends and the other bracket member 33 on the opposite side is crashed, thereby preventing the support member 30 and the device main body 23 (supported by the support member 30) from being deformed.

In addition, the support member 30 is fastened using the bolt 56 via the fastening part 34 to the inner panel 13 of the door main body 11. Therefore, (i) even if the bracket members 31 and 32 are broken at the worst, it is possible to reliably prevent the device main body 23 from being detached from the door main body 11, and (ii) it is possible to prevent inaccurate positioning of the device main body 23 attached to the support member 30 with respect to the vehicle body.

Additionally, the device main body 23 and the support member 30 are coupled with each other by (i) common fastening to the bracket members 31 and 32 using the bolts 47 and 48, and (ii) common fastening using the bolt 49 to the position between the bracket members 31 and 32. Therefore, as explained above, such common fastening can be performed in advance so as to form a module and easily and reliably attach the module to the vehicle body. In order to form such a module, the device main body 23 and the support member 30 should be coupled with each other by at least one of the above two common fastening processes (i) and (ii).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above embodiment, the device main body 23 having the inflator 20 and the airbag 22 is installed via the support member 30 into the door 3. However, any type for deploying the airbag 22 toward a side of the passenger may be installed not only in the door 3 but also in a side wall of the vehicle body, which is not opened or closed.

On the other hand, the bracket members 31 and 32 attached to the support member 30 should be at least a pair, that is, two bracket members are necessary; however, three or more bracket members may be used.

In addition, the bracket member 31 and 32 are attached to the face of the support member 30 opposite to the device main body 23; however, they may be attached to a lower part of the support member 30.

Furthermore, a bending part or the like may be provided at the center of the coupling plate part 43 so as to increase the deformable range of the bracket members 31 and 32.

What is claimed is:

1. An airbag apparatus for a vehicle, comprising:
   a device main body having an inflator and an air bag which is expanded toward a passenger of the vehicle by a gas jet from the inflator; and
   a support member to which the device main body is attached so as to arrange the airbag apparatus in a door or a side wall of the vehicle, wherein:
   the support member is attached to a body of the vehicle via a pair of bracket members which are positioned in the vicinity of both ends of the support member and are easily deformable when an impact is applied, so that the support member is arranged between the bracket members; and
   the support member has a main plate part and a fastening part which extends from the main plate part and is positioned between the bracket members, and the support member is fastened to the body of the vehicle via the fastening part.

2. The airbag apparatus in accordance with Claim 1, the device main body and the support member are coupled with each other in advance, using at least one of a common fastening of them to the bracket members and a mutual coupling between them at the position of the fastening part between the bracket members.

* * * * *

UNITED STATES PATENT AND TRADEMARK OFFICE
CERTIFICATE OF CORRECTION

| | | |
|---|---|---|
| PATENT NO. | : 7,552,939 B2 | Page 1 of 1 |
| APPLICATION NO. | : 11/668837 | |
| DATED | : June 30, 2009 | |
| INVENTOR(S) | : Ochiai | |

It is certified that error appears in the above-identified patent and that said Letters Patent is hereby corrected as shown below:

On the Title Page, Section {56}, FOREIGN PATENT DOCUMENTS, delete "JP 0224970 10/1990" and insert --JP 2-249740 10/1990--.

Signed and Sealed this

Twenty-fourth Day of November, 2009

David J. Kappos
*Director of the United States Patent and Trademark Office*